US012481709B2

(12) United States Patent
Chen et al.

(10) Patent No.: US 12,481,709 B2
(45) Date of Patent: Nov. 25, 2025

(54) METHODS AND APPARATUS FOR CORRECTING SEARCH QUERIES

(71) Applicant: Walmart Apollo, LLC, Bentonville, AR (US)

(72) Inventors: Anyi Chen, Weehawken, NJ (US); Guang Yang, Bellevue, WA (US); Eran Lewis, Brooklyn, NY (US); Zheng Yan, Short Hills, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/331,482

(22) Filed: May 26, 2021

(65) Prior Publication Data

US 2022/0382818 A1 Dec. 1, 2022

(51) Int. Cl.
*G06F 16/9535* (2019.01)
*G06F 16/9032* (2019.01)
*G06F 16/907* (2019.01)
*H04L 67/50* (2022.01)

(52) U.S. Cl.
CPC .... *G06F 16/9535* (2019.01); *G06F 16/90324* (2019.01); *G06F 16/907* (2019.01); *H04L 67/535* (2022.05)

(58) Field of Classification Search
CPC ............ G06F 16/9535; G06F 16/907; G06F 16/90324; H04L 67/535
See application file for complete search history.

(56) References Cited

U.S. PATENT DOCUMENTS

| | | | |
|---|---|---|---|
| 7,296,019 B1 | 11/2007 | Chandrasekar et al. | |
| 8,412,726 B2* | 4/2013 | Yan | G06F 16/9535 707/767 |
| 9,286,391 B1* | 3/2016 | Dykstra | G06F 16/285 |
| 9,317,606 B1 | 4/2016 | Nayak et al. | |

(Continued)

FOREIGN PATENT DOCUMENTS

JP  2017182724 A  * 10/2017

OTHER PUBLICATIONS

Nancy Blachman, "Spelling Corrections and Suggestions", GoogleGuide, https://web.archive.org/web/20120215121431/https://www.googleguide.com/spelling_corrections.html (Year: 2012).*

(Continued)

*Primary Examiner* — Van H Oberly
*Assistant Examiner* — Brooks T Hale
(74) *Attorney, Agent, or Firm* — Morgan, Lewis & Bockius LLP; Manita Rawat

(57) ABSTRACT

This application relates to apparatus and methods for automatically determining query corrections based on prior interactions of users with a search query. In some examples, a computing device receives a search query from a user, and returns a query correction to the user in response to the search query. The computing device obtains engagement data corresponding to the query correction from the user. The computing device also updates one of a query-correction database and a typo-candidate database based at least in part on the engagement data. When the computing device receives the search query from another user, it corrects the search query from the another user using the query-correction database and the typo-candidate database.

20 Claims, 6 Drawing Sheets

(56) References Cited

U.S. PATENT DOCUMENTS

| | | | |
|---|---|---|---|
| 10,176,168 B2* | 1/2019 | Gao | G06F 40/232 |
| 11,409,831 B1* | 8/2022 | Vines | G06F 16/164 |
| 2011/0295840 A1* | 12/2011 | Ciaramita | G06F 16/2453 |
| | | | 707/719 |
| 2013/0060560 A1 | 3/2013 | Mahkovec et al. | |
| 2013/0226892 A1* | 8/2013 | Ehsani | G06F 16/9538 |
| | | | 707/706 |
| 2014/0195506 A1* | 7/2014 | Perlegos | G06F 16/3322 |
| | | | 707/706 |
| 2014/0207748 A1* | 7/2014 | Sood | G06F 16/90324 |
| | | | 707/706 |
| 2016/0063094 A1 | 3/2016 | Udupa et al. | |
| 2017/0207980 A1* | 7/2017 | Hudis | H04L 41/0803 |
| 2017/0371965 A1* | 12/2017 | Davar | G06F 16/951 |
| 2020/0110839 A1* | 4/2020 | Wang | G06F 16/335 |
| 2022/0180246 A1* | 6/2022 | Mondal | G06N 5/04 |

OTHER PUBLICATIONS

Ben, "Check spelling and grammar in Office", Microsoft, https://web.archive.org/web/20200807194408/https:/support.microsoft.com/en-us/office/check-spelling-and-grammar-in-office-5cdeced7-d81d-47de-9096-efd0ee909227 (Year: 2020).*

"iphone User Guide", Apple, htttps://web.archive.org/web/20190704224507/https:/support.apple.com/guide/iphone/use-predictive-text-iphd4ea90231/ios (Year: 2019).*

George Nguyen, "Google is suggesting searches based on users' recent activity", Search Engine Land, https://searchengineland.com/google-is-suggesting-searches-based-on-users-recent-activity-334309 (Year: 2020).*

* cited by examiner

METHODS AND APPARATUS FOR CORRECTING SEARCH QUERIES

TECHNICAL FIELD

The disclosure relates generally to query corrections and, more specifically, to electronically determining and providing a query correction using user engagement data.

BACKGROUND

At least some websites, such as retailer websites, advertise items that customers can purchase. For example, the websites may allow a customer to provide search queries (e.g., search requests, search terms) through a search box, matches the search queries to items, and displays the items to the customer. In some examples, computing devices, such as smartphones, allow the customer to audibly provide the search queries. For example, a smartphone may have speech recognition capability that generates textual information from human speech. The customer may speak a request to search for items, and the smartphone may generate textual information identifying the request. The websites may then search for items based on the generated textual information. In some examples, the websites perform a spell check on the search query in order to assist a user in finding the right search terms prior to or while providing item recommendations. In this way, the website may provide a user with a query correction based on the search query. The query correction may include corrected typographical mistakes for terms in the original search query. In some examples, item recommendations may be automatically presented based on the corrected query. In other examples, a user may be given a choice to search using the original query or the corrected query.

Some websites use historical engagement data to provide query corrections. In such examples, a website may use prior interactions of users with corrected queries to rank various candidate corrections to present to the user based on a search query. A rule-based method (e.g., n-gram frequency as a feature) is often used to determine and rank the candidate corrections for terms (e.g., tokens) in a search query. However, the rule-based method is often limited to a word corpus used to find closest matches to the terms. In such examples, uncommon words, such as brands, television character names, etc. may not be available for candidates. As such, some promising candidates may get missed due to the limitation of the rule, since the word corpus may not match the potential customer search terms. As a result, the ranking algorithm may rank a wrong correction (e.g., combination of terms) to the top position and provide a wrong correction.

As a result, the customer may not be interested in the corrected query and the items related to it. For example, the query correction may not satisfy the intentions of the customer's search request. In some examples, a customer may be interested in items that have certain attributes which the items related to the query correction may not share. As a result, customers may forgo purchasing items on the website, resulting in sales losses to a retailer. For example, the customer may visit a different website to purchase an intended item. Moreover, the customer may not be as satisfied with the shopping experience as when more relevant query corrections were provided. As such, there are opportunities to improve web-based query correction systems.

SUMMARY

The embodiments described herein are directed to automatically determining query corrections based on a search query. For example, the search query may identify a string of characters, such as one or more search terms. In some examples, the search query is generated based on speech recognition capabilities of a computing device. The embodiments may determine query correction candidate(s) based on the search query. For example, the query correction candidate(s) may include correcting typographical errors in the one or more search terms. The query correction candidate(s) may be presented to the user as a query correction(s). User interactions (e.g., rejections, re-typing, etc.) with the query correction candidate(s) may be analyzed. The user interactions may then be used to further improve the query correction system to provide better query correction candidate(s) for future search queries. For example, when a user re-types a query in response to a presented query correction(s), the re-typed theory may be used to update a typo-candidate database that stores a type and a correction as a pair. In this example, the search query may be paired with the re-typed query in the typo-candidate database for future retrieval when the same or similar search query is received. For another example, when a user rejects a presented query correction(s) and chooses to search with the original search query, a query-correction database, that stores the search query and the correction as a pair and associates the pair with a good or a bad correction rating, may be updated such that when the same or similar search query is received in the future, the search query may not be corrected.

As a result, the embodiments may allow a retailer to present more relevant query corrections to a customer. As a result, the customer may be more likely to purchase an item from the retailer based on a better customer experience with searches. In addition, presenting customers with more relevant query corrections may lead to increased sales. Moreover, the embodiments may allow a customer to spend less time searching for an item when presented with more relevant corrections and their associated item recommendation, thereby saving the customer time from having to re-type queries. The time savings may also allow time for a customer to consider additional items for purchase. Additionally, the embodiments may allow the retailer to provide a more pleasant shopping experience to the customer, thereby increasing customer affinity to the retailer. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device is configured to receive a search query from a user. The computing device is further configured to return a query correction to the user in response to the search query. The computing device is configured to obtain engagement data corresponding to the query correction from the user. Also, the computing device is configured to update one of a query-correction database and a typo-candidate database based at least in part on the engagement data. The computing device is also configured to receive the search query from another user. Further, the computing device is configured to correct the search query from the another user using the query-correction database and the typo-candidate database.

In some embodiments, a method is provided that includes receiving a search query from a user. The method also includes returning a query correction to the user in response to the search query. Further, the method includes obtaining engagement data corresponding to the query correction from the user. The method includes updating one of a query-correction database and a typo-candidate database based at least in part on the engagement data. The method also includes receiving the search query from another user. Additionally, the method includes correcting the search query from the another user using the query-correction database and the typo-candidate database.

In yet other embodiments, a non-transitory computer readable medium has instructions stored thereon, where the instructions, when executed by at least one processor, cause a computing device to perform operations that include receiving a search query from a user. Further, the operation include returning a query correction to the user in response to the search query. The operations further include obtaining engagement data corresponding to the query correction from the user. The operations include updating one of a query-correction database and a typo-candidate database based at least in part on the engagement data. The operations also include receiving the search query from another user. Additionally, the operations include correcting the search query from the another user using the query-correction database and the typo-candidate database.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
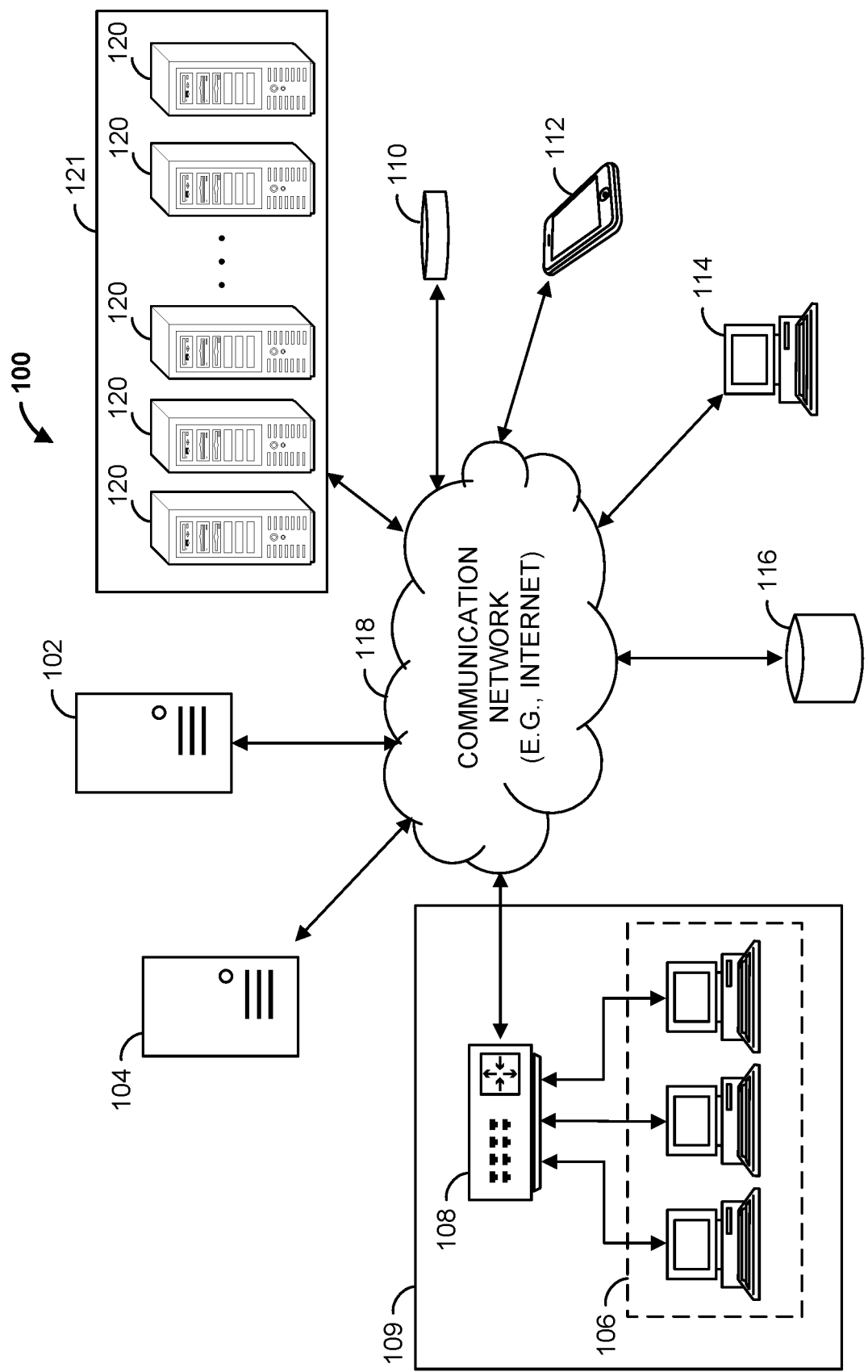
FIG. 1 is a block diagram of a query correction system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a query correction system 100 that includes an correction candidate computing device 102 (e.g., a server, such as an application server), a web server 104, workstation(s) 106, one or more processing devices 120, workstation(s) 106, database 116, and one or more customer computing devices 110, 112, 114 operatively coupled over network 118. Correction Candidate computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of correction candidate computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to correction candidate computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, correction candidate computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with correction candidate computing device 102 over communication network 118. The workstation(s) 106 may send data to, and receive data from, correction candidate computing device 102. For example, the workstation(s) 106 may transmit data identifying items purchased by a customer at store 109 to correction candidate computing device 102.

Although FIG. 1 illustrates three customer computing devices 110, 112, 114, query correction system 100 can include any number of customer computing devices 110, 112, 114. Similarly, query correction system 100 can include any number of correction candidate computing devices 102, processing devices 120, workstations 106, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and N$^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit user session data related to a customer's activity (e.g., interactions) on the website. For example, a customer may operate one of customer computing devices 110, 112, 114 to initiate a web browser that is directed to the website hosted by web server 104. The customer may, via the web browser, view query corrections recommendations (e.g., query corrections, query correction candidates), and item recommendations for items displayed on the website, and may click on correction recommendations and/or item recommendations, for example. The website may capture these activities as user session data, and transmit the user session data to correction candidate computing device 102 over communication network 118. The website may also allow the operator to add one or more of the items to an online shopping cart, and allow the customer to perform a "checkout" of the shopping cart to purchase the items. The website may also allow the customer to type in and/or voice search queries on the website. In some examples, web server 104 transmits the search queries the customer has requested from the website to correction candidate computing device 102.

In some examples, correction candidate computing device 102 may execute one or more models (e.g., algorithms), such as a machine learning model, statistical model, logarithmic model, language model, etc., to determine query corrections to advertise to the customer (i.e., query correction candidates, query corrections, corrections). Correction candidate computing device 102 may transmit the query corrections to web server 104 over communication network 118, and web server 104 may display one or more of the query corrections on the website to the customer. For example, web server 104 may display the query correction(s) to the customer on a homepage, a catalog webpage, an item webpage, or a search results webpage of the website (e.g., as the customer browses those respective webpages).

In some examples, web server 104 transmits a search request (e.g., search query) to correction candidate computing device 102. The search request may identify a search query provided by the customer (e.g., via a search bar of the web browser). In response to receiving the request, correction candidate computing device 102 may execute the one or more processors to determine one or more query corrections to display to the customer (i.e., query correction candidate(s)). Correction candidate computing device 102 may transmit the results to web server 104 over communication network 118. Web server 104 may display the results on a results webpage, for example.

Correction candidate computing device 102 is further operable to communicate with database 116 over communication network 118. For example, correction candidate computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to correction candidate computing device 102, in some examples, database 116 can be a local storage device, such as a hard drive, a non-volatile memory, or a USB stick. Correction candidate computing device 102 may store engagement data received from web server 104 in database 116. Correction candidate computing device 102 may also receive from web server 104 user session data identifying events associated with search and/or browsing sessions, and may store the user session data in database 116.

In some examples, correction candidate computing device 102 generates feature vectors for a plurality of models (e.g., machine learning models, statistical models, algorithms, etc.) based on item catalog data, historical user session data, and current user session data for the user and/or items. Correction candidate computing device 102 trains the models based on their corresponding feature vectors, and correction candidate computing device 102 stores the models in a database, such as in database 116 (e.g., cloud storage).

The models, when executed by correction candidate computing device 102, allow correction candidate computing device 102 to determine query corrections for a query correction to display to a customer. For example, correction candidate computing device 102 may obtain the models from database 116. Correction candidate computing device 102 may then receive, in real-time from web server 104, current user session data identifying real-time events of the customer interacting with a website (e.g., during a browsing session) including a user provided search query related to a search. In response to receiving the user session data, correction candidate computing device 102 may execute the models to determine query corrections for a search query (e.g., search terms) to display to the customer.

In some examples, correction candidate computing device 102 receives a search query from a customer computing device 110 via web server 104. The search query may include one or more search terms. For example, a search query may be "nik shoes" where "nik" and "shoes" are two search terms. In some examples, correction candidate computing device 102 may query a query-correction database that stores historical pairs of queries and corresponding corrections, with each pair including a query and a corresponding correction. The historical pairs may be determined from historical user search session data for a plurality of users of the website, where a pair is stored when a user interacts with a certain correction provided in response to that query. If the search query matches a query in the query-correction database, correction candidate computing device 102 may determine the corresponding correction in the pair related to the query in the query-correction database as the query correction to present to the user.

Otherwise, correction candidate computing device 102 may generate query correction(s) based on the search query, search terms, historical user data (e.g., historical user engagement data), and/or a word corpus. For example, correction candidate computing device 102 may determine candidate query correction(s) for recommendation to the user as an initial matter based on a rule-based method applied to each of the search terms in the received search query. In some examples, candidate terms for each search term may be determined based on a distance (e.g., transpose, delete, insert, replace characters) between the search term and the candidate terms. In some examples, only candidate terms within a predetermined character distance (e.g., 3, 4) may be selected. For example, candidate terms for search term "nik" may be determined to be "nike," "niko," and "nik," and candidate terms for search term "shoes" may be determined as "shoe," "show," and "shoes." Candidate query corrections may then be determined as combinations of the candidate terms for each search term. For example, for the above example, there may be nine candidate query corrections, such as "nike shoe," "nike show," "nike shoes," "niko shoes," "niko show," "niko shoes," "nik shoe," "nik show," and "nik shoes." The candidate query corrections may be ranked. In some examples, the candidate query corrections may be ranked based on translation probabilities of each candidate term in the corresponding candidate query correction, an n-gram score for the corresponding query correction, and/or a penalty score for the corresponding candidate query correction. In some examples, the n-gram score for a candidate term may be determined based on item titles for each item sold by the retailer stored in the catalog data, third party data (e.g., word corpus, Wikipedia data, google data, etc.). For example, a score for candidate query corrections, "nike shoes" and "nik show" may be determined as follows:

$$P(\text{nike shoes}) = \text{translation prob}(\text{nike}|\text{nik}) + n\text{-gram}(\text{nike shoes}) + \text{penalty} \quad \text{eq.1}$$

$$P(\text{nik show}) = \text{translation prob}(\text{show}|\text{shoes}) + n\text{-gram}(\text{nik show}) + \text{penalty} \quad \text{eq. 2}$$

The candidate query corrections may then be ranked based on the scores of each of the candidates. Correction candidate computing device 102 may then present the candidate query correction with the highest rank to the customer as the query correction via web server 104.

Correction candidate computing device 102 may receive user engagement data from the customer computing device 110 via web server 104. For example, user engagement data may include user interaction with the presented query correction. In some examples, the user engagement data may include rejection of the query correction, re-typing another search query by the customer, and/or acceptance of the query correction. If the customer accepts the query correction, for example, by clicking on the query correction and/or browsing item recommendations provided with respect to the query correction, correction candidate computing device 102 may store the search query and the query correction in the query-correction database as a query and correction pair, respectively.

In some examples, the user engagement data may indicate a rejection of the query correction. For example, the customer may click on a "search instead for" button on the webpage to reject the query correction and choose to search under the original search query. For example, for a search query, "shrek shirt," query correction, "shark shirt," may be rejected by the customer, as the customer may want to search for a "shrek shirt." Upon receiving an indication in the user engagement data of the rejection of the query correction, correction candidate computing device 102 may store feature data, such as search traffic, click count, add to cart count, order count, add to list count, minimum word frequency in the query, etc. for each of the search query and the rejected query correction in user session and/or user engagement data. In some examples, a pre-trained linear model may be used to score the features for both the search query and the rejected search query. If the score is lower than a predetermined threshold, the query correction may be determined to be unnecessary. The search query may be stored in the query-correction database as paired with itself such that when the search query is received in the future, for example from another or the same customer, no query correction is provided. As such, over time, pre-trained linear model and engagement data from plurality of customers may be used to find unnecessary or bad corrections from rejected query correction for search queries, and a list of queries may be generated and stored in the query-correction database that do not need to be corrected.

In some other examples, the user engagement data may indicate that the customer re-typed a search query in response to the query correction. For example, instead of interacting with any of the search results related to the presented query correction, the customer may re-type a query in the search box. For example, for a search query, "waxman foor stopper," a query correction, "waxman foot stopper," the customer might re-type the query, "door stopper." In some examples, the indication that the customer re-typed a search query may be determined based on a shared user intent indicated by a shared term between the search query and the re-typed query. The search term and the re-typed term may then be stored as a pair in a typo-candidate database as a type being the term that the user changed and the corresponding candidate being the re-typed term. In the above example, the pair saved in the typo-candidate database may be the typo, "foor" and the candidate may be "door." In some examples, the pair may only be stored if the re-typed tem has an edit distance less than a predetermined threshold as provided in the rules-based method. In some examples, the rules based method may include a rule that the first character of a candidate term must be the same as the first character of the corresponding search term. In such case, "door" would not have been a candidate term for a search term "foor." However, by storing the pair "foor-door" in the typo-candidate pair based on the re-typing, correction candidate computing device 102 may be able to use "door" as a candidate for search term, "foor" received in a query in the further.

Typo-candidate database may include pairs of typos and their corresponding candidates, each pair including a typo and a candidate correction for the typo. A typo may be a term that may include a typographical error. A candidate correction may be a candidate term that may be used to correct the typographical error in the original corresponding term. Typo-candidate database may store pairs that can be used as candidate terms for search terms.

In the alternative, the received search query may be a long query, for example, including a number of words over a predetermined threshold. In some examples, correction candidate computing device 102 may assume that for a long search query, even though one or more of the search terms have a typographical error, other terms may be used to refine the item recommendations (e.g., search results). For example, for a long search query, "bell ottom pants for girls," no query corrections may be found based on the rule-based model. In such examples, correction candidate computing device 102 may present the user with a predetermined number of search results or item recommendations. Upon receiving an indication in the user engagement data of user interacting with at least one search result, correction candidate computing device may for a candidate term for the search term with the typographical error within item titles for the presented search results. The candidate terms may be selected from the item titles such that the candidate terms are within the edit distance threshold in the rules-based model. For the above example, the candidate term may be determined to be "bottoms" for the search term "ottoms" based on the item titles for the search results including "bottoms" and the edit distance (i.e., 1) between the search term "ottoms" and the candidate term "bottoms" being below the predetermined edit distance threshold. The candidate term and the corresponding search term may then be stored as a pair in the typo-candidate database for a future retrieval such that when "ottoms" is received in a future query, correction candidate computing device may use "bottoms" as a candidate term to determine a query correction for the future query.

In some examples, correction candidate computing device 102 may also generate tensors based on semantic similarities between items (e.g., sponsored items, non-sponsored items). The tensors may be used to rank and score all items based on relevancy to the user for a current user session. The initial set of items for recommendation may then determine initial profits, scores and/or ranks for the items based on the relevancy scores and cost scores (e.g., profit margin scores, cost-per-click score for each sponsored item).

Correction candidate computing device 102 may receive the same or similar search query from another customer device, such as customer computing device 112. Customer computing device 102 may then determine a query correction to provide to the customer of the customer computing device 112 based on the updated typo-correction database and the update query-correction database. For example, upon receiving search query, "shrek shirt" from customer computing device 112 via web server 104, correction candidate computing device 102 may not correct the search query. As another example, upon receiving search query, "bell ottoms" from customer computing device 112 via web server 104, correction candidate computing device 102 may use candidate query correction, as "bell bottoms." Similarly, upon receiving search query, "foor stopper" from customer computing device 112 via web server 104, corrections candidate computing device 102 may use candidate query correction as "door stopper." In this way, user engagement data may be used to correct the model for previously provided wrong corrections or no corrections, such that the future query corrections may be more accurate.

In some example, correction candidate computing device 102 may also include a brand-product database that includes an association between brand and a product type for each product sold by the retailer. The brand-product database may be automatically and/or periodically generated and updated based on customer search session. The database may be based on the merchant data. For example, for an item with item title, "Sideways pave set diamond infinity necklace in 12 white gold," the brand-product database may store "angara" and "necklace" as associated with each other. In this way, the word corpus used for generating query corrections may include search queries generally used by customer, which include "brand" and "product type," for example "angara necklace," which may not be found in the n-gram word corpus that includes only item titles from a catalog database of the retailer, but may not match a customer's search query. In this way, the word corpus may be expanded to include words and combination of words that are more commonly used by customers for searching within a retailer's website. In such examples, the query corrections for future queries may further be based on the brand-product database.

Figure 2:
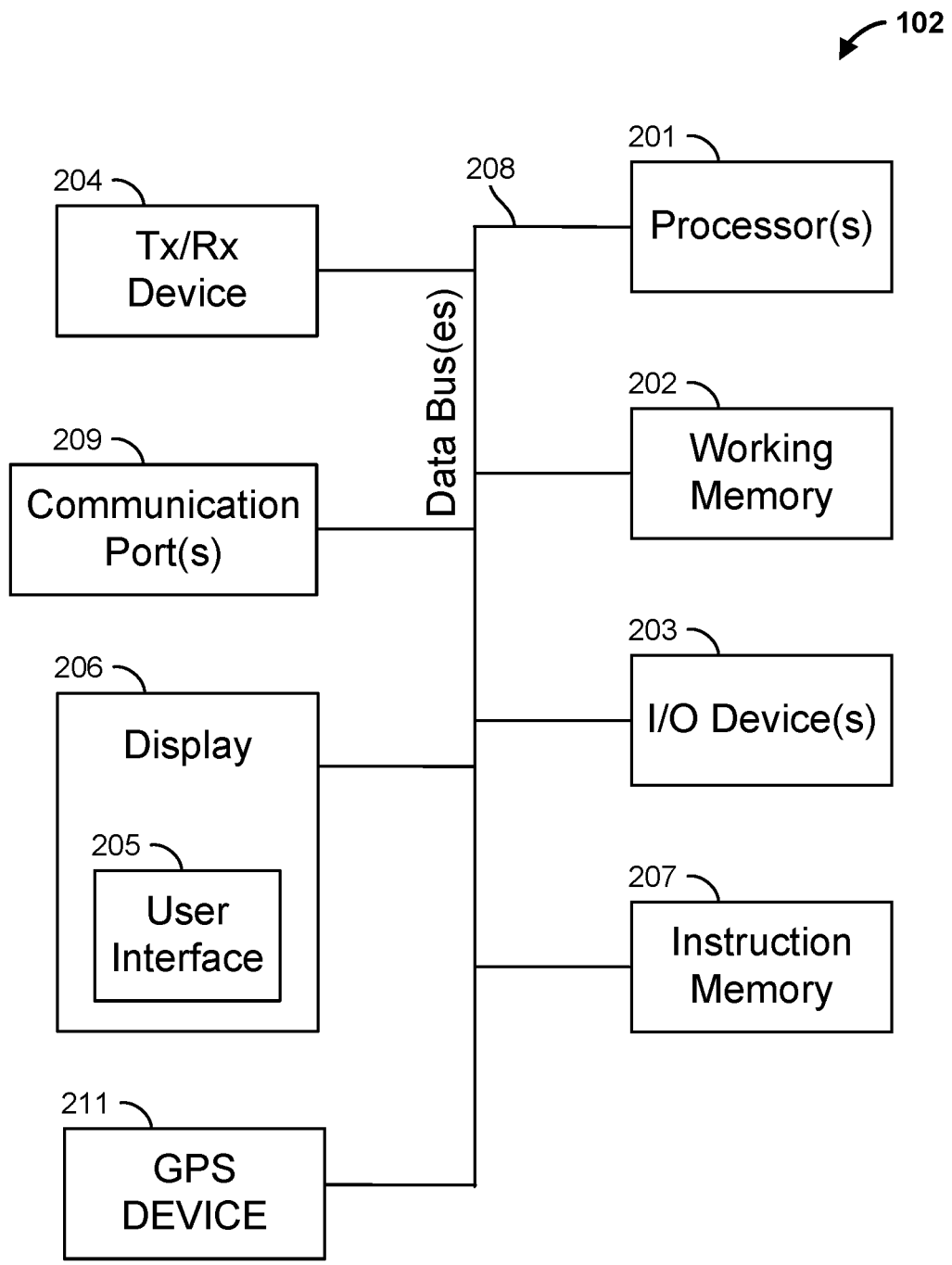
FIG. 2 is a block diagram of the correction candidate computing device of the query correction system of FIG. 1 in accordance with some embodiments.

FIG. 2 illustrates the correction candidate computing device 102 of FIG. 1. correction candidate computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of relevancy score computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allows for the transfer (e.g., uploading or downloading) of data, such as the uploading of executable instructions to be executed by processor 201 and stored in instruction memory 207.

Display 206 can display user interface 205. User interfaces 205 can enable user interaction with correction candidate computing device 102. For example, user interface 205 can be a user interface for an application of a retailer that allows the retailer to select machine learning models to be applied to user session data received from web server 104, such as user session data received for customers accessing a retailer's website hosted by web server 104. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 correction candidate computing device 102 will be operating in. Processor(s) 201 is operable to receive data from, or send data to, a network, such as communication network 118 of FIG. 1, via transceiver 204.

Figure 3:
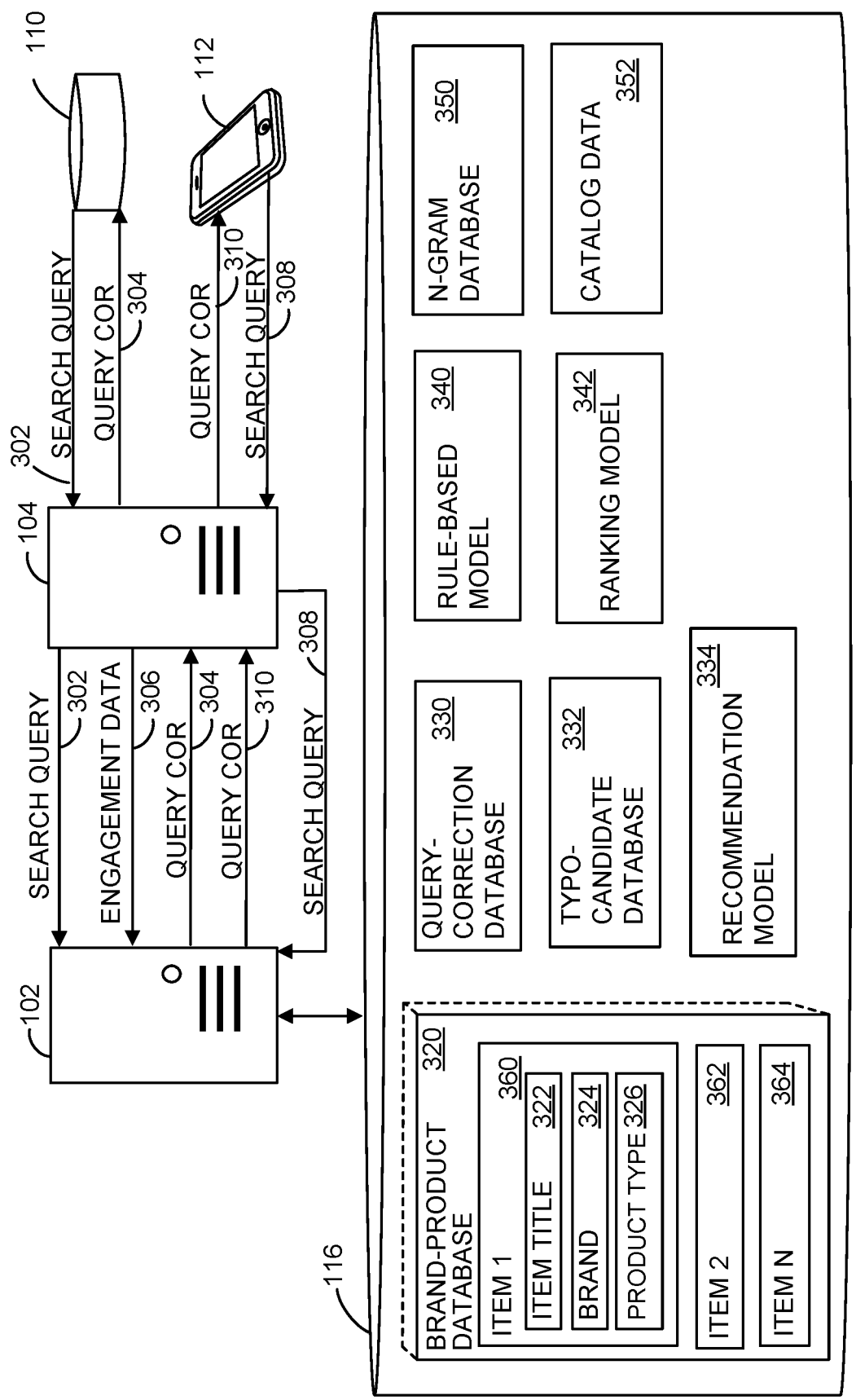
FIG. 3 is a block diagram illustrating examples of various portions of the query correction system of FIG. 1 in accordance with some embodiments.

FIG. 3 is a block diagram illustrating examples of various portions of the query correction system 100 of FIG. 1. As indicated in the figure, correction candidate computing device 102 may receive search query 302 from client device 110 via web server 104. Search query 302 may include one or more search terms received from a user of client device. In response to receiving the search query from web server 104, correction candidate computing device 102 may generate query correction 304. The query correction 304 may be generated using data stored in database 116, such as, one or more of brand-product database 320, query-correction database 330, typo-candidate database 33, and/or n-gram database 350.

Correction candidate computing device 102 may use a rule-based model 340 to determine query correction 304 to provide to user of customer computing device 110 via web server 104. Rule-based model may apply one or more rules to the search query 302 to determine the query correction. In some examples, the rules may include an edit distance rule and a rule stating that the first letter of a candidate term must be the same character as the first character of the corresponding search term in the search query 302 for which the candidate is to be considered. The edit rule may include an edit distance threshold that defines a maximum distance that a candidate term may be from its corresponding search term. Candidate terms may be determined for each search term. Ranking model 342 may be configured to rank each combination of candidate terms based on a score that defines a probability of the combination being the intent of the user. Candidate terms may be chosen from the n-gram database 350 that includes a word corpus in a feature vectors that defines frequency of the combinations appearing in the catalog data 352.

Query-correction database 330 may associate queries with corresponding corrections based on user interactions with the search results of the query corrections provided historically. If search query 302 is found in the query-correction database 330, the correction associated with the search query 302 may be used as the query correction 304 by correction candidate computing device 102. If the search query 302 is not found in the query-correction database 330, candidate terms may be determined for each search term in search query 302 based on the n-gram database 350, and the typo-candidate database 332. Ranking model 342 may rank each of the combination of candidate terms (i.e., candidate query corrections) based on n-gram frequencies of the combination stored in n-gram database 350 and the translation probabilities of the candidate terms in the combination. Recommendation model 334 may determine the query correction 304 based on the ranking of the combinations. Query correction 304 may be the highest ranked combination.

In some examples, brand-product database 320 may also be used to determine query correction 304. In this example, brand-product database 320 may include item 1 360, item 2 362, . . . , item N 364 from catalog data 352. Each item may be associated with an item title, a brand and a product type. For example, item 1 360 is associated with item title 322, brand 324, and product type 326. Recommendation model 320 may select candidate terms from the brand-product database 320 as well.

Correction candidate computing device 102 may receive engagement data 306 from web server 104. The engagement data 306 may include interactions of the user, via customer computing device 110, with the query correction 304. Engagement data 306 may include user rejection of query correction 304, user re-typed query, and/or user acceptation of query correction 304. Based on the engagement data 306, correction candidate computing device may update the query-correction database 330 and/or the typo-candidate database 332.

Correction candidate computing device 102 may receive search query 308 from customer computing device 112 via web server 104. The search query 308 may have one or more search terms common with the search query 302. Correction candidate computing device 102 may determine a query correction 310 based on the updated query-correction database 330 and/or the updated typo-candidate database 332. For example, if the search query 308 is identical to search query 302, and the engagement data 306 indicated that the user rejected the query correction 304, correction candidate computing device 102 may not provide a query correction. As another example, if the engagement data 306 indicated that the user re-typed a query, correction candidate computing device 102 may determine the re-typed query as query correction 310. Correction candidate computing device 102 may provide the query correction 310 to web server 104 to present to the user using the customer computing device 112.

Figure 4:
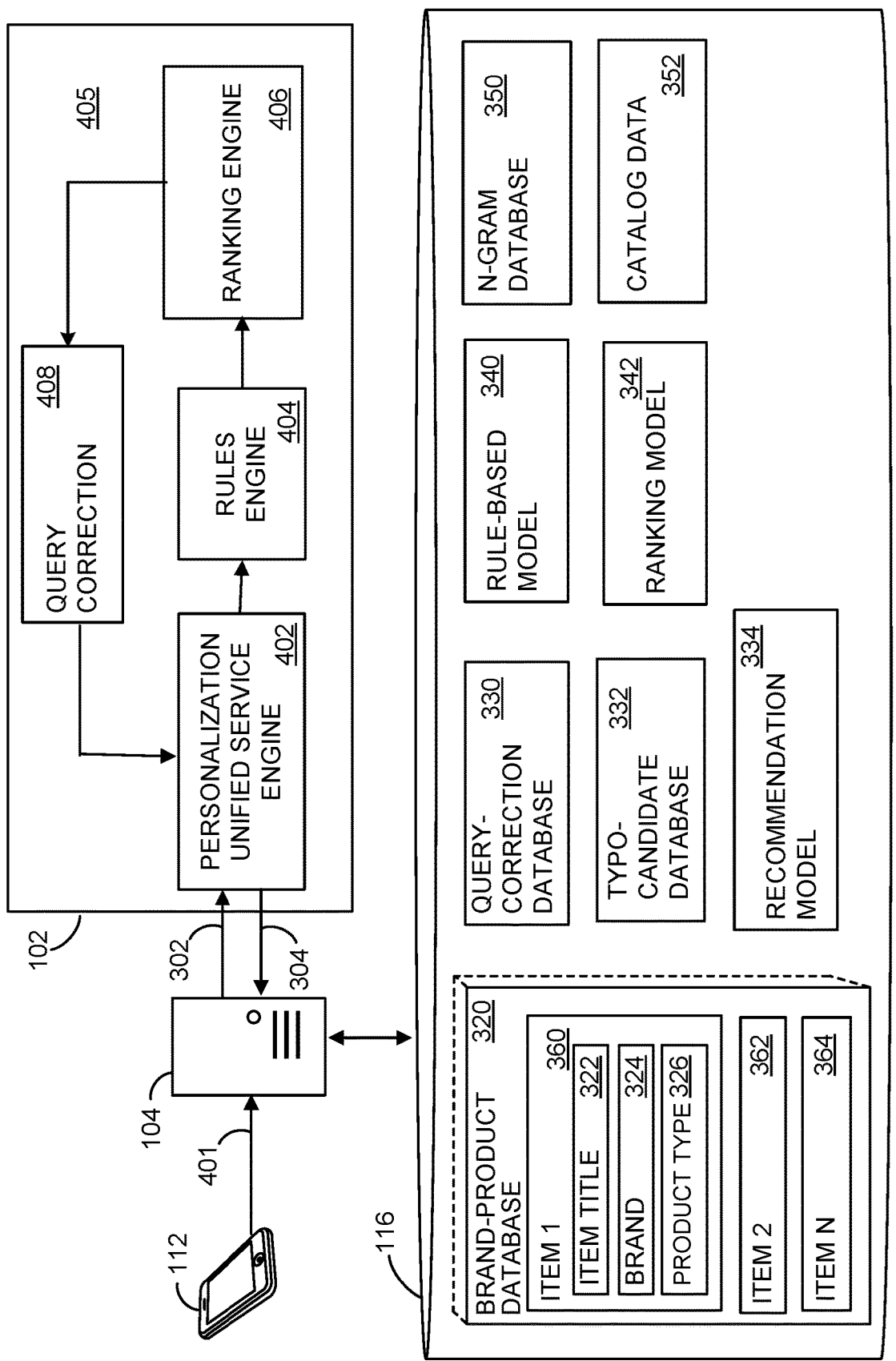
FIG. 4 is a block diagram illustrating examples of various portions of the correction candidate computing device of FIG. 1 in accordance with some embodiments.

FIG. 4 is a block diagram illustrating a more detailed view of correction candidate computing device 102. Specifically correction candidate computing device 102 includes personalization unified service engine 402, rules engine 404, and ranking engine 406. In some examples, one or more of personalization unified service engine 402, rules engine 404, and ranking engine 406 are implemented in hardware. In some examples, one or more of personalization unified service engine 402, rules engine 404, and ranking engine 406 are implemented as an executable program maintained in a tangible, non-transitory memory, such as instruction memory 207 of FIG. 2, which may be executed by one or processors, such as processor 201 of FIG. 2. For example, personalization unified service engine 402 may obtain search query 302 as a message 401 from customer computing device 112 via web server 104 and may execute model(s) included in the database 116.

In this example, web server 104 transmits a search query 302 to correction candidate computing device 102. Search query 302 may include search terms for item recommendations for presentation to a particular user using the customer computing device 112. Personalization unified service engine 402 receives search query 302, and receives and parses the brand-product database 320, query-correction database 330, typo-candidate database 332, and/or n-gram database 350 from database 116. The Personalization unified service engine 402 provides the search query 302 to the rules engine 404, and ranking engine 406, and other data, which may include brand-product database 320, query-correction database 330, typo-candidate database 332, and/or n-gram database 350 from database 116.

Rules engine 404 can determine one or more potential combination of candidate terms that may be used as candidate query corrections for search query 302. Rules engine 404 may use rule-based model 340 to determine one or more candidate terms for each search term in the search query 302. Rules engine 404 may include a plurality of rules for selection of the candidate terms. In some examples, a rule may include an edit distance threshold that determines whether a particular term may be included as a candidate term. Terms that meet the edit distance threshold may be included as candidate terms for the corresponding search term. In some examples, a rule may be that each candidate term must start with the same character as the first character of the corresponding search term. Candidate terms that meet the criteria may be determined to be candidate terms by the rules engine 404. All possible combinations of the corresponding candidate terms for each search term may be determined to be candidate query corrections by the rules engine 404. Rules engine 404 may provide each of the candidate query corrections to the ranking engine 406 for ranking.

Ranking engine 406 can determine query correction 408 based on ranking the candidate query corrections. Ranking engine 406 may select a final query correction from the candidate query corrections using the ranking model 342. Each candidate query correction may be scored based on the combination's n-gram frequency, each candidate term in the candidate's translation probability and/or penalty (i.e., based on distance from corresponding search term). Ranking engine 406 may rank the candidate query corrections based on their corresponding scores. The highest ranking candidate query correction may be determined to be the final query correction 408.

Query correction 408 can include an ordered list of correction terms. The ordered list of correction terms may be in the same order as the candidate term's corresponding search term's position in the search query. Query correction 408 may generate data that identifies the order and/or positions of candidate terms in query correction 408.

Personalization unified service engine 402 may receive the query correction 304 from query correction 408 in a data format (e.g., message) acceptable by web server 104. Personalization unified service engine 402 transmits the query correction 304 to web server 104. Web server 104 may then update or generate the query correction and/or its corresponding search results for presentation to the user via the user device 112 based on the query correction 408.

Figure 5:
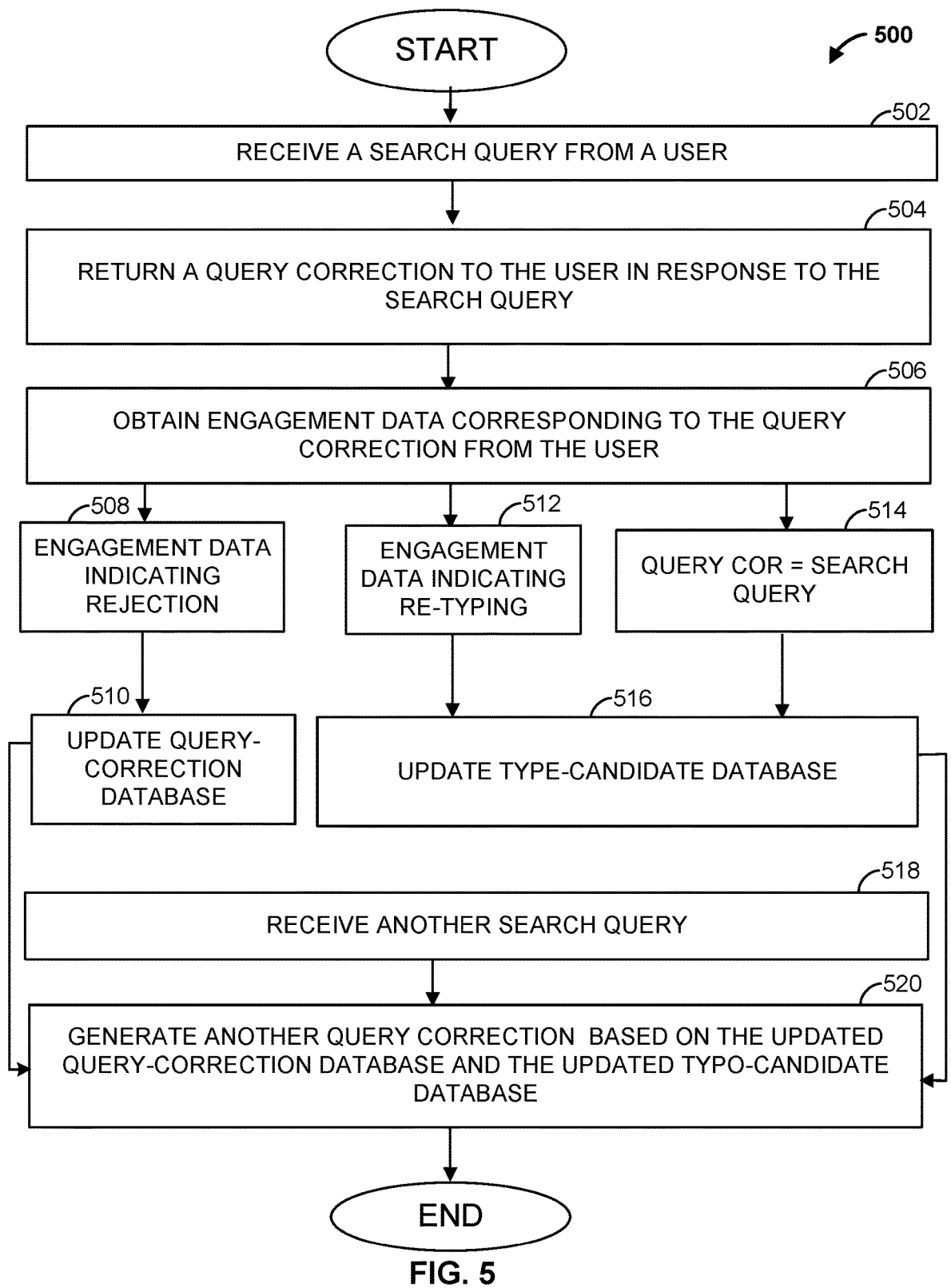
FIG. 5 is a flowchart of an example method that can be carried out by the query correction system of FIG. 1 in accordance with some embodiments.

FIG. 5 is a flowchart of an example 500 that can be carried out by the query correction system 100 of FIG. 1. Beginning at step 502, a search query is received from a user. For example, correction candidate computing device 102 may receive a search query 302 from web server 104. At step 504, a query correction is returned to the user in response to the search query. For example, correction candidate computing device 102 may transmit a query correction 304 to the customer computing device 110 via web server 104 in response to receiving the search query 302.

At step 506, engagement data corresponding to the query correction is received from the user. For example, engagement data 306 may be received corresponding to query correction 304 from the customer computing device 110 via web server 104. Depending on the engagement data, the method can move to one of steps 508, 512, or 514.

At step 508, it is determined that the engagement data indicates a rejection of the query correction. For example, correction candidate computing device 102 may determine that engagement data 306 indicated that the customer rejected the query correction. At step 510, in response to the engagement data indicating that the user has rejected the query correction, a query-correction database is updated. For example, query-correction database 330 may be updated based on engagement data 306 indicating that the user rejected the query correction.

In contrast, at step 512, it is determined that the engagement data indicates a re-typing of a query. For example, correction candidate computing device 102 may determine that engagement data 306 indicates that the customer re-typed a query in response to the query rejection.

If the method goes to step 514, at step 514, it is determined that the query correction is the same as the search query. For example, correction candidate computing device 102 may determine that engagement data 306 indicates that the query correction 304 is the same as the search query 302.

In response to steps 512 and/or step 514, the method moves to step 516. At step 516, a typo-candidate database is updated. For example, typo-candidate database 332 may be updated based on engagement data 306 indicating that the user either re-typed a query or the query correction 304 is the same as the search query 302. Typo-candidate database 332 may be updated to include a pair with search query and re-typed query if the user re-typed a query. Typo-candidate database 332 may be updated to include a pair with search query and another corrected query determined based on item titles in search results of the search query 302.

At step 518, another search query is received. For example, correction candidate computing device 102 may receive a search query 308 from web server 104. At step 520, another query correction is generated based on the updated query-correction database and the updated typo-candidate database. For example, correction candidate computing device may generate query correction 310 based on the updated query-correction database 330 and the updated typo-candidate database 332. The method then ends.

Figure 6:
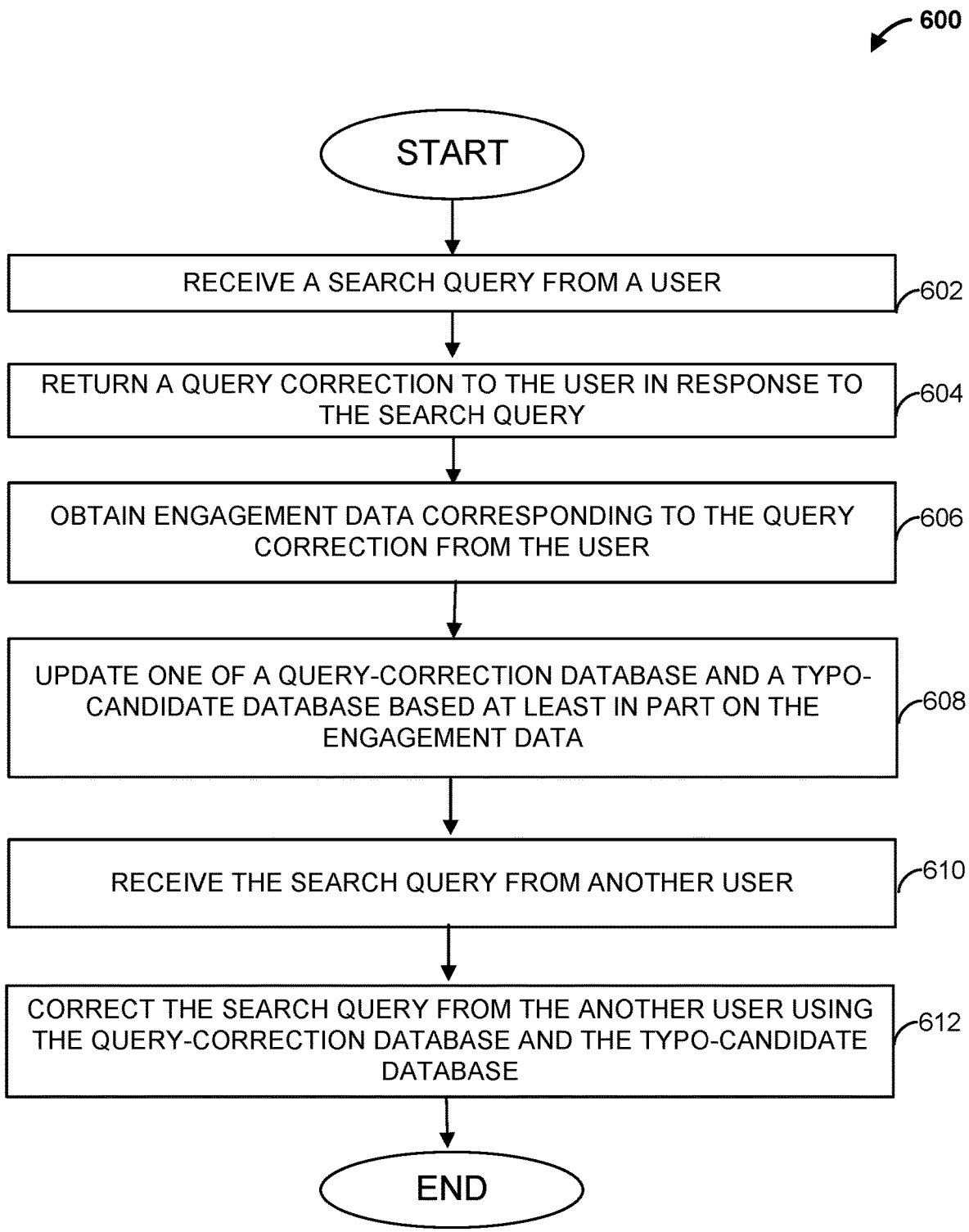
FIG. 6 is a flowchart of another example method that can be carried out by the query correction system of FIG. 1 in accordance with some embodiments.

FIG. 6 is a flowchart of an example method 600 that can be carried out by the query correction system 100 of FIG. 1. Beginning at step 602, a search query is received from a user. For example, correction candidate computing device 102 may receive a search query 302 from web server 104. At step 604, a query correction is returned to the user in response to the search query. For example, correction candidate computing device 102 may transmit a query correction 304 to the customer computing device 110 via web server 104 in response to receiving the search query 302.

At step 606, engagement data corresponding to the query correction is received from the user. For example, engagement data 306 may be received corresponding to query correction 304 from the customer computing device 110 via web server 104. At step 608, one of a query-correction database and a typo-candidate database are updated based at least in part on the engagement data. For example, correction candidate computing device 102 may update one of the query-correction database 330 and typo-candidate database 332 based on the engagement data 306.

At step 610, the search query is received from another user. For example, correction candidate computing device 102 may receive the search query 308 from web server 104, the search query 308 being identical to search query 302. At step 612, the search query form the another user is corrected using the query-correction database and the typo-candidate database. For example, correction candidate computing device 102 may generate query correction 310 that corrects search query 308 using the updated query-correction database 330 and the updated typo-candidate database 332. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system, comprising:
   a processor; and
   a non-transitory memory storing instructions that, when executed, cause the processor to:
      receive, during a first session at a website displayed at a computing device associated with a user, a first search query from the user that provides information inputted by the user in a first native format associated with the computing device;
      responsive to receiving the first search query, automatically perform a first process during the first session comprising:
         format the first search query from the first native format to a structured format, wherein the structured format defines a machine readable encoding of a first text object that includes the information and different from the first search query, thereby producing a first structured query;
         apply the first structured query to a first pre-trained model in a plurality of models to receive as output from the first pre-trained model a first query correction comprising one or more recommended items to be displayed on the website to the in response to the first text object, wherein the one or more recommended items are semantically identified by the first pre-trained model based on the first text object;
         obtain engagement data responsive to displaying the first query correction at the computing device, the engagement data comprising at least one click by the user on the one or more recommended items indicative of at least a user rejection of the first query correction, a second search query different from the first search query and the first query correction, and/or and a user acceptation of the first query correction;
         generate multi-dimensional feature data for the plurality of models based on item catalog data, historical user data, and the engagement data;
         train the plurality of models to decrease a number of rejected query corrections based on the multi-dimensional feature data, thereby forming a first trained model from the first pre-trained model;
         update, by at least one rule based model of the plurality of models and in accordance with the training based on the multi-dimensional feature data, one of a query-correction database and a typo-candidate database based at least in part on the engagement data, wherein the one of the query-correction database and the typo-candidate database is updated to include at least one candidate term selected from a title of an item associated with the at least one click and different from the at least one or more recommended items, and wherein the at least one candidate term satisfies a plurality of rules implemented by the rule based model, the plurality of rules comprising a first rule defining a predetermined maximum edit distance of a term in the search query and a second rule defining a threshold character match value, thereby representing a portion of the information, and is ranked on at least one of a translation probability, an n-gram score, or a penalty score of at least one candidate item;
      receive, during a second session at the website displayed at another computing device associated with another user, a third search query from the other user that provides the information inputted by the other user in a second native format associated with the other computing device;
      responsive to receiving the third search query, automatically perform a second process during the second session comprising:
         format the third search query from the second native format to the structured format that defines the machine readable encoding of the candidate term, thereby producing the second structured query;
         apply the second structured query to the first trained model to receive as output from the first trained model a second query correction for the third search query comprising the item to be displayed on the website to the other user wherein the item is semantically identified by the first trained model based on the first text object.

2. The system of claim 1, wherein the engagement data includes the second search query different from the first search query and the first query correction, and in response to obtaining the engagement data, the instructions cause the processor to update the typo-candidate database based at least in part on the second search query and the first search query.

3. The system of claim 2, wherein the instructions cause the processor to correct the search query from the other user to the second query.

4. The system of claim 1, wherein the instructions cause the processor to:
   receive engagement data in response to the query correction including an indication of the other user rejecting the first query correction in preference of the first search query; and in response to receiving the engagement data including the rejection, update the query-correction database for the rejection.

5. The system of claim 4, wherein the instructions cause the processor to not correct a respective search query from a subsequent user that includes the information.

6. The system of claim 4, wherein the instructions cause the processor to cause, at the other computing device associated with the other user, display of one or more interactable user interface elements, and wherein the indication of the other user comprises an interaction, via an input at the other computing device, with a first interactable user interface element in the one or more interactable user interface elements.

7. The system of claim 4, wherein the receiving the engagement data is performed in less than 100 milliseconds.

8. The system of claim 4, wherein the engagement data comprises a corresponding affinity of the user to the website.

9. The system of claim 1, wherein the instructions cause the processor to update the typo-candidate database based at least in part on the one or more recommended items and the first search query.

10. The system of claim 1, wherein the first query correction is based at least in part on a brand-item database associating each item with a corresponding brand.

11. The system of claim 1, wherein the first search query includes a plurality of terms, and the first query correction includes at least one term that is different from the plurality of terms.

12. The system of claim 1, where the first native data format comprises one or more first utterances spoken by the user, and wherein the third data format comprises one or more second utterances spoken by the other user different from the one or more first utterances.

13. The system of claim 1, wherein the first native data format comprises one or more utterances spoken by the user, and the second native data format comprises a third text object inputted at least in part by the other user.

14. The system of claim 1, wherein the second structured query one or more query correction candidates, one or more query corrections, one or more corrections, one or more item recommendations, or a combination thereof, and wherein the instructions further cause the processor to cause, at the other computing device associated with the other user, display of the one or more query correction candidates, one or more query corrections, one or more corrections, one or more item recommendations, or the combination thereof for selection by the other user.

15. The system of claim 1, the predetermined edit distance is defined, at least in part, by a transpose, a deletion, an insertion, a substitution, or a combination.

16. The system of claim 1, wherein the first process further comprises
generate one or more tensors based on (i) one or more semantic similarities between two or more items in a plurality of items and (ii) a respective current user session relevancy,
rank each item in the plurality of items based on the one or more tensors, and
select a set of items in the plurality of items for inclusion in the one or more recommended items, each item in the of items satisfying a threshold rank.

17. The system of claim 1, wherein the engagement data comprises a fourth text object that provides information in the first native format.

18. The system of claim 1, wherein the query-correction database and the typo-candidate are maintained remote from the system.

19. A method comprising:
receiving, during a first session at a website displayed at a computing device associated with a user, a first search query from the user that provides information inputted by the user in a first native format associated with the computing device;
responsive to receiving the first search query, automatically performing a first process during the first session comprising:
formatting the first search query from the first native format to a structured format, wherein the structured format defines a machine readable encoding of a first text object that includes the information and different from the first search query, thereby producing a first structured query;
applying the first structured query to a first pre-trained model in a plurality of models to receive as output from the first pre-trained model a first query correction comprising one or more recommended items to be displayed on the website to the in response to the first text object, wherein the one or more recommended items are semantically identified by the first pre-trained model based on the first text object;
obtaining engagement data responsive to displaying the first query correction at the computing device, the engagement data comprising at least one click by the user on the one or more recommended items indicative of at least a user rejection of the first query correction, a second search query different from the first search query and the first query correction, and/or and a user acceptation of the first query correction;
generating multi-dimensional feature data for the plurality of models based on item catalog data, historical user data, and the engagement data;
training the plurality of models to decrease a number of rejected query corrections based on the multi-dimensional feature data, thereby forming a first trained model from the first pre-trained model;
updating, by at least one rule based model of the plurality of models and in accordance with the training based on the multi-dimensional feature data, one of a query-correction database and a typo-candidate database based at least in part on the engagement data, wherein the one of the query-correction database and the typo-candidate database is updated to include at least one candidate term selected from a title of an item associated with the at least one click and different from the at least one or more recommended items, and wherein the at least one candidate term satisfies a plurality of rules implemented by the rule based model, the plurality of rules comprising a first rule defining a predetermined maximum edit distance of a term in the search query and a second rule defining a threshold character match value, thereby representing a portion of the information, and is ranked on at least one of a translation probability, an n-gram score, or a penalty score of at least one candidate item;
receiving, during a second session at the website displayed at another computing device associated with another user, a third search query from the other user that provides the information inputted by the other user in a second native format associated with the other computing device;

responsive to receiving the third search query, automatically performing a second process during the second session comprising:

formatting the third search query from the second native format to the structured format that defines the machine readable encoding of the candidate term, thereby producing the second structured query;

applying the second structured query to the first trained model to receive as output from the first trained model a second query correction for the third search query comprising the item to be displayed on the website to the other user wherein the item is semantically identified by the first trained model based on the first text object.

20. A non-transitory computer readable medium having instructions stored thereon, wherein the instructions, when executed by at least one processor, cause a device to perform operations comprising:

receiving, during a first session at a website displayed at a computing device associated with a user, a first search query from the user that provides information inputted by the user in a first native format associated with the computing device;

responsive to receiving the first search query, automatically performing a first process during the first session comprising:

formatting the first search query from the first native format to a structured format, wherein the structured format defines a machine readable encoding of a first text object that includes the information and different from the first search query, thereby producing a first structured query;

applying the first structured query to a first pre-trained model in a plurality of models to receive as output from the first pre-trained model a first query correction comprising one or more recommended items to be displayed on the website to the in response to the first text object, wherein the one or more recommended items are semantically identified by the first pre-trained model based on the first text object;

obtaining engagement data responsive to displaying the first query correction at the computing device, the engagement data comprising at least one click by the user on the one or more recommended items indicative of at least a user rejection of the first query correction, a second search query different from the first search query and the first query correction, and/or and a user acceptation of the first query correction;

generating multi-dimensional feature data for the plurality of models based on item catalog data, historical user data, and the engagement data;

training the plurality of models to decrease a number of rejected query corrections based on the multi-dimensional feature data, thereby forming a first trained model from the first pre-trained model;

updating, by at least one rule based model of the plurality of models and in accordance with the training based on the multi-dimensional feature data, one of a query-correction database and a typo-candidate database based at least in part on the engagement data, wherein the one of the query-correction database and the typo-candidate database is updated to include at least one candidate term selected from a title of an item associated with the at least one click and different from the at least one or more recommended items, and wherein the at least one candidate term satisfies a plurality of rules implemented by the rule based model, the plurality of rules comprising a first rule defining a predetermined maximum edit distance of a term in the search query and a second rule defining a threshold character match value, thereby representing a portion of the information, and is ranked on at least one of a translation probability, an n-gram score, or a penalty score of at least one candidate item;

receiving, during a second session at the website displayed at another computing device associated with another user, a third search query from the other user that provides the information inputted by the other user in a second native format associated with the other computing device;

responsive to receiving the third search query, automatically performing a second process during the second session comprising:

formatting the third search query from the second native format to the structured format that defines the machine readable encoding of the candidate term, thereby producing the second structured query;

applying the second structured query to the first trained model to receive as output from the first trained model a second query correction for the third search query comprising the item to be displayed on the website to the other user wherein the item is semantically identified by the first trained model based on the first text object.

* * * * *